May 4, 1943.  A. J. STEINBERGER  2,318,111
PROCESS OF COATING
Filed March 23, 1940
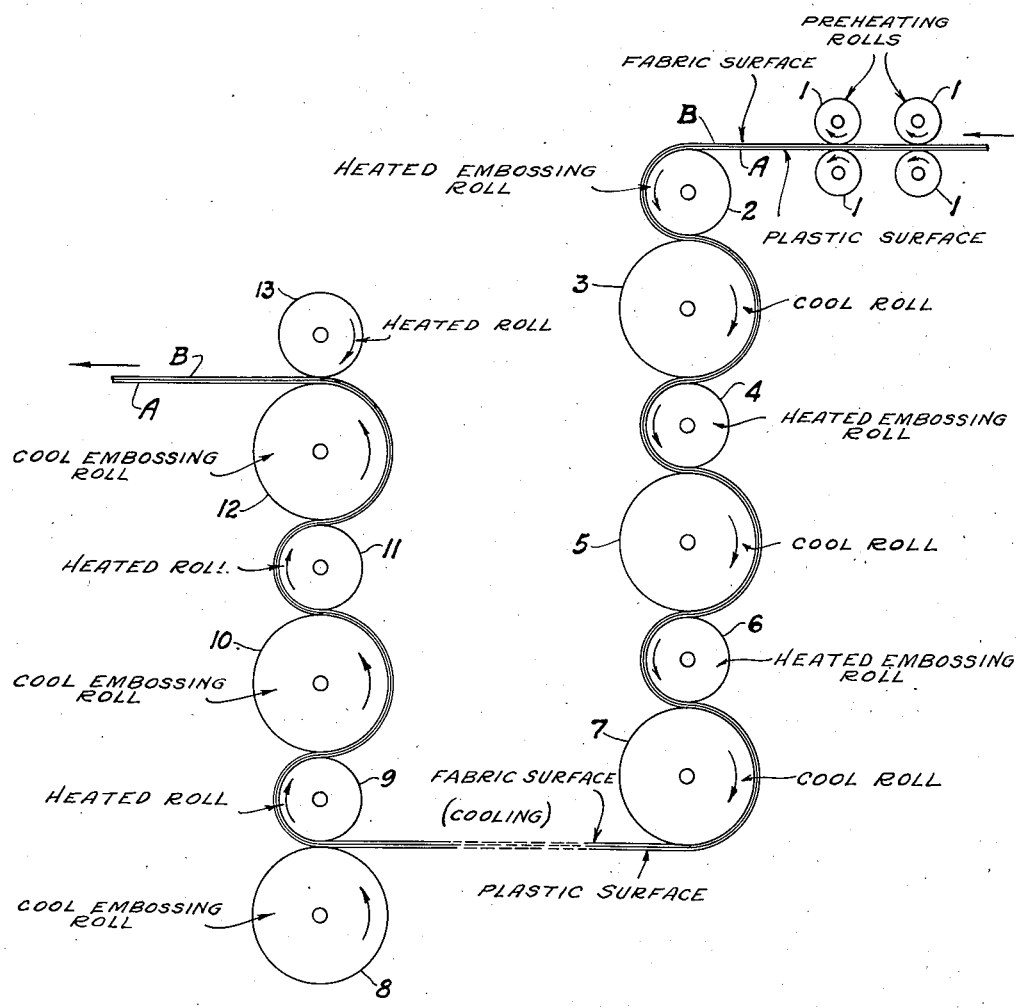
INVENTOR.
ALFRED J. STEINBERGER
BY
ATTORNEYS Patented May 4, 1943

2,318,111

UNITED STATES PATENT OFFICE 2,318,111

PROCESS OF COATING

Alfred J. Steinberger, Cumberland, Md., assignor to Celanese Corporation of America, a corporation of Delaware Application March 23, 1940, Serial No. 325,549

15 Claims. (Cl. 101—32)

This invention relates to a new and improved method of treating coated fabrics and other coated materials.

An object of this invention is to treat said coated fabrics and materials in such a manner that a soft, pliable product which will have the soft dull feel and appearance of fine calfskin may be obtained.

Another object of this invention is to so treat said fabrics that a durable, strongly bonded and cohesive material may be secured.

Other objects of this invention will appear hereinafter from the following description.

The accompanying drawing shows diagrammatically one form of apparatus for carrying out this invention.

Various methods are employed in coating fabrics for the preparation of artificial leather and the like. In some processes coatings comprising derivatives of cellulose are dissolved in volatile solvent and are spread upon the surface to be coated in any suitable manner. After the desired thickness of coating is obtained, the volatile solvent is allowed to evaporate and the composite material is ready for use or for any further treatment. In other cases, the particular derivatives of cellulose which are being used are heated to a plastic state, then placed upon the surface of the material to be coated and by means of heat and pressure a bonding of the two materials is secured. These coated materials are suitable for various uses and when embossed with the proper pattern may be used to simulate genuine leather. The difficulty which precludes a more extensive use of said coated fabrics is that while to the eye they may be given the appearance of genuine leather, their feel to the hand is stiffer, harsher and often tackier than genuine leather.

I have now discovered that these disadvantages may be overcome by a particular mechanical treatment of these coated materials and a duller, softer feeling product may be thereby obtained. This treatment comprises preheating the plastic-coated fabric or other material, preferably on the plastic side, passing it between a series of embossing surfaces which contact the plastic and non-plastic surfaces of the composite material simultaneously at different temperatures, and then, when the composite material is cool, subjecting it once more to the molding and compressing action of another set of embossing surfaces. Where the plastic coating contains little or no filler and/or is of a nature such as to be easily softened, then the coating material may be softened by preheating the same indirectly through the non-plastic side. By this procedure there is imparted to said coated material a soft handle and a dull finish which far more closely resembles genuine leather than any finish heretofore attainable.

Any suitable organic thermoplastic material may be used for coating the fabric or other supporting material in this invention. There may be employed, for instance, derivatives of cellulose such as cellulose nitrate, or organic derivatives of cellulose such as cellulose esters, or cellulose ethers. Said esters may be, for example, cellulose acetate, cellulose propionate, cellulose butyrate or mixed esters such as the acetate-propionate or the acetate-butyrate. Said cellulose ethers may be ethyl cellulose, methyl cellulose, benzyl cellulose, and the analogous cellulose ethers obtained by the esterification of cellulose with glycols and other polyhydric alcohols, as well as mixed ethers. Other thermoplastic materials such as synthetic resins may also be used, either alone or incorporated in with any of the above-mentioned thermoplastic materials.

Any desired modifying agent may be added to the thermoplastic compound employed as the coating material. Said modifying agents are substances which impart elasticity, flexibility, gloss, color, stability, etc. to the finished product. Such modifying agents may be plasticizers, dyes, pigments, lakes, filling materials, resins, oils, etc. Examples of such suitable plasticizers are camphor, dibutyl phthalate, diethyl phthalate, tricresyl phosphate, triphenyl phosphate, ethyl-para-toluene sulfonamide, etc. The choice of plasticizer will, of course, depend on the properties of the thermoplastic compound employed as the base.

Backing materials of all kinds may be employed for the thermoplastic compositions which are to be treated. Woven or knitted fabrics made of cotton or other fibers may be coated and treated according to the process of my invention, as may also be other flexible materials such as paper, leather, cardboard, etc. Where such heavier materials are treated it is obvious that they will not be as flexible as coated fabrics but my treatment will impart a desirable feel of softness to the surface thereof.

Any suitable mechanical device may be employed for preheating the plastic-coated material before it is subjected to the embossing action. Said material should preferably be heated to a point where the surface becomes tacky and soft so that it will be smooth and plastic and therefore easily embossed, condensed and more strongly pressed into the interstices of the backing material during the embossing operations. While any mechanical embossing device may be used for treating the coated fabric I prefer to use engraved metal rolls, since the use of rolls makes a higher rate of production possible.

In accord with my process the coated materials may be preheated by placing them on hot rolls and heating them until the coating composition is at the desired degree of softness. The time element involved in preheating the coated materials will of course vary depending on the composition of the plastic used for the coating. The hot soft coated material is then passed through a series of steel rolls engraved in any desired manner. To obtain the desired soft effect in the final product, the roll which comes in contact with the soft plastic coating is kept heated while that in contact with the backing material is unheated. The temperature of the roll which is positively heated may vary depending in the composition of the plastic, but this heated roll is preferably kept at temperatures of from about 200° F. to about 325° F., while the unheated roll is kept at temperatures of from about 70° F. to about 110° F. I generally prefer to pass the material through a series of rollers about four in number, but of course a smaller or greater number may be used. The number of passes to which the material is subjected in the embossing rolls will vary, depending upon the type of coating material used and also upon its thickness. The material may pass through different rollers or else repeat its course through the same rollers. At each pass, however, the plastic side of the material is in contact with the hot roll of the embossing set while the non-plastic side is in contact with the cool or unheated roll of the set.

The diameter of the rolls used may be from about 3 to about 7 inches, but larger or smaller rollers may be used if desired. Preferably, the diameter of the heated roll with which the plastic side of the coated material comes in contact is smaller than that of the unheated roll of the pair. When the diameter of the heated roll is about half the diameter of the unheated roll, particularly desirable results are obtained.

After the coated material is cooled, it is given the final treatment by passing it through another set of rolls in which the roll in contact with the plastic side of the material is cool while that in contact with the non-plastic side of the material is heated. This last set of rolls is preferably of finer grain and may have a greater diameter than the rolls used in the preliminary series of embossings. Very satisfactory results may be obtained where rolls similar to those used in processing the heated material are used for the finishing treatment. When used for the finishing treatment, however, the plastic side is placed in contact with the cool roll of larger diameter while the non-plastic side is in contact with the smaller heated roll. When the coated material is finally removed from this last set of processing rolls, it now has a soft dull finish and feel. The series of operations whereby the material is heated and softened, embossed while soft by a heated embossing surface and then finally embossed when cold by cold embossing surfaces serves to give the material a softer and richer feel to the hand.

The thickness of coating which is generally employed in my process may vary with the type of coated material which is being made and the type of service to which it is to be put. Ordinarily the coating will be from about .002 inch to about .01 inch in thickness and the embossing will be to a depth of about .0015 inch to about .005 inch depending on the type of material simulated.

The pressure of the rolls as well as the speed at which the coated material passes through them may also vary. Only moderate pressures are necessary to produce desirable results. Where a more distinct pattern is desired the pressure may be increased or the speed at which the material passes through may be decreased to permit the thermoplastic coating composition to flow into the deeper portions of the rolls engraved in accord with the design to be reproduced.

The rolls employed in my process may be heated or cooled by any suitable heating or cooling medium. Hollow rolls heated by steam, gas burners, electric resistance coils, or by hot oil may be used. In turn, any degree of coolness may be achieved by circulating refrigerated brine or water through the hollow rolls which are to be kept cool.

In this manner a wide range of artificial leathers and other materials may be produced, varying from a thinly coated material to one quite heavily coated, and depending on the type of service to which it is to be subjected, embracing a wide variety of thermoplastic coating compositions. Where such materials and compositions formerly gave products which were harsh to the feel, they yield products having a dull soft appearance and feel when using my process.

In order to further illustrate my invention but without being limited thereto, the following examples are given:

*Example I*

A mixture consisting of:

| | Parts by weight |
|---|---|
| Cellulose acetate | 100 |
| Mixed o- and p-ethyl toluene sulfonamide | 72 |
| Methyl phthalyl ethyl glycollate | 25 |
| Dimethyl ether of ethylene glycol phthalate | 3 |
| Oxidized castor oil formal | 10 |
| Leather flock | 10 |
| Calcium sulfite | 10 |
| Carbon or bone black | 3 | is mixed together and converted to a homogeneous plastic mass. This mixture A is applied in a uniform, thin layer to a cotton fabric B and bonded thereto by the application of heat and pressure. This smooth but hard surfaced coated fabric is then passed, plastic side down as shown in the drawing, between preheating rolls 1 having a surface temperature of about 250° F. until the coating becomes tacky. The composite material is then run between two sandblasted steel rolls 2, 3 at a slow speed, roll 2 being heated and roll 3 being unheated. The material is passed with the plastic side in contact with roll 2 which is heated by an internal electric heating element to a temperature about 200 to 225° F., while the fabric side contacts the unheated roll 3 which is at a temperature of about 70 to 80° F. The heated roll 2 is about 3.5 inches in diameter and coarsely sandblasted and unheated roll 3 is about 7 inches in diameter and finely sandblasted. After passing through a set of three or four such pairs of hot and cold rolls 4, 5, 6 and 7, the material is cooled off. It is then given the final treatment by running it, plastic side down and contacting a finely sandblasted cool steel roll 8 of about 7 inches in diameter while the fabric side is in contact with a heated roll 9 of about 3.5 inches in diameter. The material passes through three such pairs in the final treatment, the remaining rolls being rolls 10, 11, 12 and 13. When removed from this final treatment the coated fabric, lightly embossed to a depth of about .0025 to .003 inch, is a black material having the soft, dull appearance and feel of a fine calfskin.

*Example II*

A mixture composed of:

| | Parts by weight |
|---|---|
| Cellulose acetate | 100 |
| Mixed o- and p-toluene sulfonamide | 75 |
| Methyl phthalyl ethyl glycollate | 10 |
| Dimethyl ether of ethylene glycol phthalate | 25 |
| Oxidized olive oil | 5 |
| Leather flock | 10 |
| Red pigment (C. P. Cadmium Selenide Red) | 5 | is mixed together and converted to a homogeneous plastic mass. This mixture is applied in a cotton twill fabric and when bonded to the fabric by heat and pressure the coated fabric is processed in the manner described in Example I. A soft dull red artificial leather is produced having the feel and appearance of fine calf-skin.

The materials may be produced in any other color by the inclusion in the coating composition of any suitable pigment and effect material in place of those given in the formulation above. While said artificial leathers may be produced using various types of cellulose acetate, we prefer to use cellulose acetate of high acetyl value and more preferably cellulose acetate of about 58.6% acetyl value.

It is to be understood that the foregoing detailed description is given merely by way of illustration and that many variations may be made therein without departing from the spirit of my invention.

Having described my invention, what I desire to secure by Letters Patent is:

1. A method of treating composite materials comprising a non-thermoplastic material coated with a thermoplastic material, which comprises preheating the plastic-coated material, passing the heated material between a plurality of embossing surfaces contacting said composite material, and, after cooling said composite material, subjecting it to another pass between embossing surfaces the surface in contact with the plastic side being cool and the surface in contact with the non-plastic side being hot.

2. A method of treating composite materials comprising a non-thermoplastic material coated with a thermoplastic material, which comprises preheating the plastic-coated material, passing the heated material between a plurality of embossing surfaces, the surface contacting the thermoplastic side of said material being maintained at a higher temperature than the surface contacting the non-thermoplastic side, cooling said composite material, and then subjecting it to another pass between embossing surfaces, the surface in contact with the plastic side being cool and the surface in contact with the non-plastic side being hot.

3. A method of treating composite materials comprising a non-thermoplastic material coated with a thermoplastic material, which comprises preheating the plastic-coated material, passing the heated material between a plurality of embossing rolls, the roll contacting the thermoplastic side of said material being maintained at a higher temperature than the roll contacting the non-thermoplastic side, and, after cooling said composite material, subjecting it to another pass between embossing rolls, the roll contacting the plastic side being cool and the roll contacting the non-plastic side being hot.

4. A method of treating composite materials comprising a non-thermoplastic material coated with a thermoplastic material, which comprises preheating the plastic-coated material, passing the heated material between a plurality of embossing rolls, the roll in contact with the plastic side of said material being heated and the roll in contact with the non-thermoplastic side of the material being unheated and, after cooling said composite material, subjecting it to another pass between embossing rolls, the roll contacting the plastic side being cool and the roll contacting the non-plastic side being hot.

5. A method of treating a fabric coated with a thermoplastic material which comprises preheating the plastic-coated fabric, passing the heated material between a plurality of embossing surfaces contacting said composite material, cooling said composite material, and then subjecting it to another pass between embossing surfaces the surface in contact with the plastic side being cool and the surface in contact with the non-plastic side being hot.

6. A method of making softened artificial leather from a fabric coated with a thermoplastic material, which comprises preheating the plastic-coated fabric, passing and contacting the heated composite material between a plurality of complementary embossing surfaces which are differentially heated, cooling said composite material, and then subjecting it to another pass between embossing surfaces, the surface in contact with the plastic side being cool and the surface in contact with the non-plastic side being hot.

7. A method of treating a fabric coated with a thermoplastic material which comprises preheating the plastic-coated fabric, passing the heated material between a plurality of embossing surfaces, the surface contacting the thermoplastic side of said material being maintained at a higher temperature than the surface contacting the non-thermoplastic side, cooling said composite material, and then subjecting it to another pass between embossing surfaces, the surface contacting the plastic side being cool and the surface in contact with the non-plastic side being hot.

8. A method of treating a fabric coated with a thermoplastic material which comprises preheating the plastic-coated fabric, passing the heated material between a plurality of embossing rolls, the roll contacting the thermoplastic side of said material being maintained at a higher temperature than the roll contacting the non-thermoplastic side, and, after cooling said composite material, subjecting it to another pass between embossing rolls, the roll contacting the plastic side being cool and the roll contacting the non-plastic side being hot.

9. A method of treating a fabric coated with a thermoplastic material comprising an organic derivative of cellulose, which comprises preheating the plastic-coated fabric, passing the heated material between a plurality of embossing surfaces contacting said composite material, cooling said composite material, and then subjecting it to another pass between embossing surfaces, the surface in contact with the plastic side being cool and the surface in contact with the non-plastic side being hot.

10. A method of treating a fabric coated with a thermoplastic material comprising an organic derivative of cellulose, which comprises preheating the plastic-coated fabric, passing the heated material between a plurality of embossing surfaces, the surface contacting the thermoplastic side of said material being maintained at a higher temperature than the surface contacting the non-thermoplastic side, cooling said composite material, and then subjecting it to another pass between embossing surfaces, the surface contacting the plastic side being cool and the surface in contact with the non-plastic side being hot.

11. A method of making softened artificial leather from a fabric coated with a thermoplastic material comprising an organic derivative of cellulose, which comprises preheating the plastic-coated fabric, passing the heated material between a plurality of embossing surfaces, the surface contacting the thermoplastic side of said material being maintained at a higher temperature than the surface contacting the non-thermoplastic side, cooling said composite material, and then subjecting it to another pass between embossing surfaces, the surface contacting the plastic side being cool and the surface in contact with the non-plastic side being hot.

12. A method of treating a fabric coated with a thermoplastic material comprising cellulose acetate which comprises preheating the plastic-coated fabric, passing the heated material between a plurality of sets of embossing rolls, the roll contacting the thermoplastic side of said material being maintained at a higher temperature than the roll contacting the non-thermoplastic side, and, after cooling said composite material, subjecting it to another pass between embossing rolls, the roll contacting the plastic side being cool and the roll contacting the non-plastic side being hot.

13. A method of treating a fabric coated with a thermoplastic material comprising cellulose acetate, which comprises preheating the plastic-coated fabric, passing the heated material between a plurality of embossing rolls, the roll in contact with the plastic side of said material being heated and the roll in contact with the non-plastic side of the material being unheated, cooling said composite material, and then subjecting it to another pass between embossing rolls, the roll contacting the plastic side being cool and the roll contacting the non-plastic side being hot.

14. A method of treating a fabric coated with a thermoplastic material comprising an organic derivative of cellulose, which comprises preheating the plastic-coated fabric until the coating becomes tacky, passing the heated material between a plurality of embossing rolls, the roll contacting the thermoplastic side of said material being maintained at a temperature of about 200° F. to about 325° F. and the roll in contact with the non-plastic side of the material being maintained at a temperature of about 70° F. to about 110° F., cooling said coated fabric, and then subjecting it to another pass between embossing rolls, the roll contacting the plastic side being cool and the roll contacting the non-plastic side being hot.

15. A method of treating a fabric coated with a thermoplastic material comprising cellulose acetate, which comprises preheating the plastic-coated fabric until the coating becomes tacky, passing the heated material between a plurality of embossing rolls, the roll contacting the thermoplastic side of said material being maintained at a temperature of about 200° F., and the roll in contact with the non-plastic side of the material being maintained at a temperature of about 70° F., cooling said coated fabric, and then subjecting it to another pass between embossing rolls, the roll contacting the plastic side being cool and the roll contacting the non-plastic side being hot.

ALFRED J. STEINBERGER.